United States Patent Office 3,833,541
Patented Sept. 3, 1974

3,833,541
MOLDING POWDER OF AGGREGATES CONTAINING CARBON BLACK EMBEDDED IN MATRIX OF VINYL CHLORIDE-ACETATE RESIN AND HEAT-STABILIZER
Ping Kang Shen, Leominster, Mass., assignor to Borden, Inc., Columbus, Ohio
No Drawing. Filed July 3, 1972, Ser. No. 268,811
Int. Cl. C08f 45/08, 45/24
U.S. Cl. 260—42.53                            5 Claims

ABSTRACT OF THE DISCLOSURE

A molding powder suitable for making articles such as phonograph records is prepared by suspension polymerization of vinyl chloride and vinyl acetate in the presence of carbon black and heat-stabilizer, using an azo-type initiator as the sole initiator. Said molding powder has the advantage that is it used directly for molding without the usual dust-encumbered steps of compounding resin and carbon black at the molding site.

BACKGROUND OF THE INVENTION

The customary procedure used in molding vinyl articles such as phonograph records entails blending a composition comprising the vinyl resin and a heat-stabilizer with carbon black. Since both the carbon black and stabilizer are in the form of finely comminuted particles, the transfer of raw materials to the blending equipment is encumbered with much dust. The dust contaminates the atmosphere requiring operators to wear gas masks, and the machine and operating room is covered with a layer of the dust requiring frequent and difficult cleaning. In particular, certain preferred stabilizers such as lead compounds are hazardous to persons exposed to the polluted atmosphere.

SUMMARY OF THE INVENTION

A way has now been found to avoid the dust-encumbered blending step at the molding site. By use of an azo-type initiator, it has been surprisingly found that vinyl chloride and acetate monomers can be made to copolymerize satisfactorily in the presence of carbon black and heat-stabilizer. By careful control of the means of addition of the comminuted carbon and heat-stabilizer to the polymerization kettle, pollution at that stage can be avoided. The resultant product is a powder of aggregate particles, each aggregate particle containing copolymer, stabilizer and carbon, the carbon being in form of small particles coherently embedded in the resin/stabilizer matrix. This powder can be used directly for molding without the dusty addition of carbon black or heat-stabilizers and with complete avoidance of air-pollution at the molding site.

Briefly stated, the method of this invention comprises: (1) dispersing in water vinyl chloride monomer, vinyl acetate monomer, a suspending agent, an azo-type initiator, a heat-stabilizer, and finely comminuted carbon; (2) suspension-copolymerizing said monomers under a pressure initially at about 100–130 p.s.i. until the pressure falls to about 30 p.s.i., to form a slurry of aggregate particles, each aggregate particle containing copolymer, stabilizer and carbon, the carbon being in form of small particles coherently embedded in a resin/stabilizer matrix; (3) venting off any residual unreacted monomers; (4) centrifuging the resultant slurry to separate said aggregate particles; (5) drying said particles to form a free-flowing powder; and (6) molding said powder under heat and pressure to form a molded article.

DETAILED DESCRIPTION OF THE INVENTION

The Initiator

In the suspension-polymerization of this invention, it is necessary to use an azo-type initiator. The preferred initiator is 2,2'-azobisisobutyronitrile. Other azo-type initiators which can be used include azo-cumene, 2-t-butyl-azo-2-cyano-4-methoxy-4-methyl pentane, 2-t-butyl-azo-2 - cyano - 4 - methyl pentane, 2,2'-azo-bis($\alpha$-$\gamma$)dimethyl valeronitrile, and the like. The initiator is used in quantity sufficient to maintain suspension polymerization of the monomers, preferably from .05–.15% based on the total weight of monomers charged.

When the more customary initiators of the peroxy type, such as lauroyl peroxide, caproyl peroxide or benzoyl peroxide are used in the presence of carbon black, inhibition of polymerization takes place, resulting at best in low yields of resin, requiring impracticably long times for reaction. In addition to the disadvantages of the resultant increased cost and reduced operation efficiency, the use of such peroxy initiators is completely impractical because the amount of conversion to polymer in such a system cannot be predetermined with sufficient precision to anticipate the proper corresponding amounts of carbon black and stabilizer to be used.

It has unexpectedly been discovered that by substituting the peroxide type initiator with an azo-type catalyst, the polymerization of vinyl chloride and vinyl acetate can be carried out in the presence of carbon black and heat-stabilizer in normal polymerization cycles and with high yields.

The Process

The present method thus comprises charging as usual into a pressure kettle, deionized water, the vinyl acetate and vinyl chloride monomers, conventional suspending agents and optional other adjuvants and an azo-type initiator and adding thereto the heat-stabilizer and carbon black either in a free-flowing powder state or as a dispersion or dispersions in water or monomer. The pH is maintained at a level between about 6.5 and 8.5 (preferably 7.3–7.7) by the addition of appropriate and commonly used neutralizing agents or buffers. The temperature is raised under agitation to a level in the range of between about 100 and 156° F., preferably about 145–149° F., bringing the pressure to a level in the range 100 to 130, preferably about 110–120, p.s.i. The total amount of both monomers can be charged right from the start or, preferably, the vinyl chloride can be added continuously during polymerization, a procedure well known in the art to provide a relatively uniform copolymer composition. The mixture is reacted until the pressure falls to about 20–30 p.s.i., whereby the monomers are about 90–96% converted to copolymer. After venting off the residual monomers, the suspension polymerized product is separated from the water by any conventional method, preferably by centrifugation, and the product is dried in the usual way.

In a modification of the process, as exemplified in Examples I and II herein, the heat stabilizer is omitted from the polymerization system. The resultant product can then be molded simply by the addition of selected heat-stabilizer of formulator's choice at the molding site.

The water layer separated from the powder product is substantially water-white, containing only a negligible amount of residual carbon black. Thus substantially all the carbon black is contained in the resin-based powder. Examination under a microscope of individual particles of the powder shows that each powder particle is in the form of an aggregate, the smaller carbon particles being embedded in the resin/stabilizer matrix.

The Monomers

The monomers to be used in preparing the resin of this invention are vinyl chloride and vinyl acetate in a weight ratio between 80/20 and 90/10; the preferred ratio is 82/18–88/12.

The Carbon Black

The carbon black used in this invention can be selected from any commercially available grade of carbon black commonly used in the formulation of vinyl resins, including channel blacks and furnace combustion blacks. While some of the advantages of this invention can be gained with carbon black having particle sizes varying from 2 to about 700 millimicrons, it is preferred to use channel high-color grades for maximum blackness, these having particle sizes in the range of 2–100 millimicrons. For use in making phonograph records, it is preferred to use particle sizes in the ranges of 4–27 millimicrons. The amount of carbon black used can be between about 0.1 and 3.5%, based on the total weight of monomers charged, the preferred amount being about 0.5–1.0%.

The carbon black can be added directly to the aqueous polymerization medium in the dry powdered form, or it can be pre-dispersed first in water or organic solvent and added to the aqueous polymerization medium as such a dispersion. A particularly appropriate form of such pre-dispersion makes use of vinyl acetate monomer itself as the organic solvent. Any suitable mixing means can be used to make the pre-dispersion, such as speed impeller mixer, pebble mill or high-speed impingement mill. Anionic or nonionic dispersing agents can be used to assist in achieving good dispersion. Such agents are discussed in greater detail below in the section on secondary emulsifiers.

Alternatively, commercially available aqueous dispersions of carbon black can be used. As described further below, the heat-stabilizer and/or transfer agent can be predispersed in the same dispersion with the carbon black.

Transfer Agents

Chain transfer agents conventionally used in the manufacture of vinyl chloride/acetate copolymers can be used also in the method of this invention, the amount being dependent upon the desired degree of modification of the final performance characteristics of the copolymer. Exemplarily the chain transfer agent is used at a level of 0–2% based on weight of monomers and can be selected singly or in combination from carbon tetrachloride, trichloroethylene, perchloroethylene, tetrahydrofuran, benzene, toluene, butyraldehyde and other substances having the properties of chain transfer.

The chain transfer agent can be added directly to the reactor or it can be pre-dispersed with carbon black and/or heat-stabilizer as described below.

Heat Stabilizer

The heat-stabilizer used can be selected from any commercially available type of stabilizer commonly used for heat stabilizing vinyl resins. Exemplarily, the heat-stabilizer can be a metal soap of zinc, lead, cadmium, calcium or barium. Common types include lead, calcium, barium and zinc stearates, cadmium, barium and zinc laurates, barium 2-ethylhexoate, barium nonylphenate and the like. Sodium soaps can also be used.

Preferred types of stabilizers include dibasic lead phosphite, dibasic lead stearate, tetrabasic lead fumarate, lead chlorosilicate and dibasic lead phthalate.

The heat stabilizer can be used in amount between 0.5 and 2% by weight of the total monomers charged; the preferred amount of stabilizer being .5–1.5%.

The stabilizer may also comprise a secondary commercial stabilizer selected from epoxy compounds, exemplarily, epoxidized soya oil, epoxidized linseed oil, epoxidized tall oil esters, butyl and octyl epoxy stearate and the like; and from certain phosphites including diphenyldecyl phosphite, phenyldidecyl phosphite and trisnonylphenyl phosphite. There may also be used pentaerythritol, sorbitol, melamine, benzoguanamine or dicyandiamide.

The heat-stabilizer can be charged directly to the aqueous polymerization medium, exemplarity as a dry powder. Alternatively, it can be pre-dispersed in water or solvent and charged in such dispersed form. According to a preferred procedure, the heat-stabilizer is dispersed in the same water or solvent, preferably vinyl acetate, as is the carbon black. If chain transfer agent is used, this can also be added to the same dispersion. Thus both carbon black and heat-stabilizer can be dispersed together in a mixture of vinyl acetate and, say, trichloroethylene in the proportions desired for the charge. Such a dispersion can exemplarily be stirred gently to maintain homogeneity while being charged to the reactor but such stirring is not critical; when the dispersion is in vinyl acetate monomer, only gentle stirring is sufficient to maintain a homogeneous dispersion even in the absence of secondary emulsifier.

Suspending Agent

The suspending agent used can be the conventional gelatin, polyvinyl alcohol or methylcellulose, as well as other commonly used materials including both natural gums and synthetic polymers such as poly(vinyl methyl ethermaleic anhydride), maleic anhydride/vinyl acetate copolymers, polyethylene oxide, cellulose derivatives such as hydroxypropylmethyl cellulose and the like. In general, a quantity equal to 0.05–0.3% by weight of total monomer charged can be used, the preferred amount being about 0.1–0.2%.

Secondary Emulsifiers

To provide better wetting and dispersion of the suspending system and for the usual function of controlling the type of surface left on the suspension-polymerized particle, small amounts of surfactants or secondary emulsifiers can be used such as, exemplarily, sodium lauryl sulfate, magnesium lauryl sulfate, a sodium alkyl benzene sulfonate, sodium and potassium salts of alkyl napthalene sulfonic acids, dialkyl esters of sodium sulfosuccinate and like anionic materials; also polyoxyethylene lauryl ethers such as the product available commercially as Brij 35, condensates of ethylene oxide with sorbitan, successive condensates of propylene oxide and ethylene oxide with propylene glycol such as are available commercially as Pluronics, nonylphenoxypoly(ethyleneoxy) ethanols such as are available commercially as Igepals, and like nonionic materials.

This invention will be further illustrated by description in connection with the following examples of the practice of it, wherein proportions are in parts by weight unless stated otherwise.

Example I

A reaction kettle was charged with 18,200 grams of deionized water, 79 grams of a 17% by weight solution of methyl vinyl ether—maleic anhydride in deionized water, sodium hydroxide in quantity sufficient to bring the pH to about 8.2, 39 grams sodium acetate and 9.4 grams of azobisisobutyronitrile. The kettle was sealed and evacuated.

A dispersion of 117 grams of carbon black (marketed by the Cabot Corporation as Black Pearl Monarch 71) in 1170 grams vinyl acetate and 85.8 grams trichloroethylene was added. Vinyl chloride in the amount of 2760 grams was then introduced under pressure and the batch was raised to 148° F. Agitation was maintained throughout. Additional 160-gram increments of vinyl chloride were then added at intervals of about 6 hours until the total amount of vinyl chloride in the batch was 6600 grams. During the addition of vinyl chloride, the pressure varied between 110–118 p.s.i. After 8 hours, the pressure dropped to 38 p.s.i. and in 45 minutes later, to 30 p.s.i.

The contents of the kettle were cooled to room temperature, separated by certifugation to yield a compact wet cake composed of solid particles. The supernatant aqueous layer was water white.

After drying the wet cake at 135° F. for about 4 hours in a forced draft oven, a free-flowing powder was obtained having a bulk density of .71 grams per cubic centimeter, and 95% of all particles passed 40 mesh screen.

The particles of the powder were observed under the microscope to be composed of a semi-transparent matrix containing embedded therein discrete particles of carbon black.

The yield corresponded to a 90% conversion of the monomers to a copolymer having a vinyl chloride/vinyl acetate (VCl/VAc) weight ratio of 85/15 and a carbon black content of 1.5% based on weight of resin.

When rubbed between two pieces of white paper, the powder left no black stain after being brushed off, in strong contrast with the properties of a physical blend of 1.5 parts carbon black and a 85/15 VCl/VAc resin prepared in like manner but in the absence of carbon black. The blended powder, after being mixed intensively on a Henschel mixer, left abundant black stain on the sheets of white paper. Also, whereas the mechanical blend gave rise to serious dusting during the mixing procedure, virtually no dust was observed when an aliquot of the product of this example was experimentally put through the Henschel mixer.

An aliquot of the direct powder of this example, without benefit of further mixing, was tested under exact conditions used to mold a phonograph record. One essential property of the resin for phonograph record manufacture is its ability to flow, under proper temperature, pressure and time, into the grooves of the disc-shaped stamper dies. This was measured by pressing one gram of the powder product of this example between the platens of a hydraulic press at 300° F., 200 lbs. per sq. in. pressure for 15 seconds. The pressed disc was examined under a microscope for carbon dispersity and its diameter measured to evaluate flow behavior.

Examination of the pressed disc under a microscope showed that the dispersity of the carbon black particle was substantially uniform and very similar to that obtained from a corresponding prior-art blend of resin, stabilizer and carbon black of the same overall composition.

Likewise, the diameter of the disc was 6.20 cm. corresponding exactly to that obtained with said prior-art blend.

Thus, the product article was satisfactory in all respects, meeting the specifications previously set for a blended product.

Example II

A reaction kettle was charged with 17,400 grams of deionized water, 780 grams of a 2% aqueous solution of Methocel 90 HG (a commercial grade of cellulose ether having 19–24% methyl ether groups and 4–12% propylene glycol ether groups and having a 2% aqueous solution viscosity at 20° C. of 80–120 centipoises); and 9.4 grams of azobisisobutyronitrile. The kettle was sealed and evacuated. There was then added a dispersion of 78 grams of a carbon black (Super Carbovac available commercially from Cabot Corporation) in 1170 grams of vinyl acetate and 93.6 grams trichloroethylene. There was also added 18 grams of 4% aqueous sodium hydroxide and 30 grams of Tamol SN, an anionic surfactant stated by the supplier to be the sodium salt of condensed naphthalene sulfonic acid. 2760 grams of vinyl chloride was added. After the temperature of the contents in the polymerizer had reached 149° F. 3840 grams of vinyl chloride was then added in 160-gram portions over a 6 hour period. Eight hours after the polymerization temperature was reached, the pressure dropped from 118 p.s.i. to 61 p.s.i. After twelve hours the pressure reached 30 p.s.i. After centrifuging and drying as in Example I, a powder was obtained having a bulk density of 0.62 grams per cubic centimeter; 97% of this powder passed through a 40 mesh screen. The powder left no black stain when rubbed between white sheets of paper. Conversion of monomers was greater than 90%. The particles contained about 1.0%, based on weight of resin, of carbon black, visible under the microscope as discrete particles embedded in the resin. The powder gave a satisfactory molded article without any problem with dusting.

Example III

A reaction kettle was charged with 18,000 grams of deionized water, 15 grams of a polyethylene oxide condensate having an approximate molecular weight of 4,000,000 (available commercially under the proprietary name Polyox) and 15 grams of magnesium lauryl sulfate as a suspending agent. There was then added 90 grams of dibasic lead stearate and 7.2 grams of azobisisobutyronitrile. This was followed by 400 grams of an aqueous dispersion, made by dispersing in 980 grams deionized water, 180 grams of a carbon black (available from Columbia Carbon Company as Columbia 999), 10 grams of Tamol SN and 18 grams of a 4% aqueous sodium hydroxide solution. The reactor was sealed and evacuated. 900 grams of vinyl acetate and 66 grams of trichloroethylene were introduced followed by 3020 grams of vinyl chloride. The temperature was raised to 148° F. and 2080 grams of vinyl chloride was added over a period of 4 hours in 130 grams increments. After 10 hours and 55 minutes, the pressure fell to 30 p.s.i. After centrifuging and drying as in Example I, a powder was obtained having a bulk density of 0.59 grams per cubic centimeter. 92% of this powder passed through a 40 mesh screen. Monomer conversion to polymer was greater than 90%. Microscopic observation of the powder particles showed that discrete particles of carbon black were embedded in a transparent matrix. The composition of the powder corresponded to 3.0% carbon black and 1.5% dibasic lead stearate, based upon the total weight of monomer charged. The ratio of vinyl chloride to vinyl acetate in the copolymer was 85/15. The molded piece tested under the same conditions as in Example I displayed excellent carbon dispersion and moldability. Rubbing between white papers left no black stains, and no dusting problem was encountered during the handling of the resins.

Example IV

A reaction kettle was charged with 17,400 grams of deionized water, 780 grams of a 2% aqueous Methocel 90 HG solution and 11.7 grams azobisisobutyronitrile. The kettle was sealed and evacuated and there was then added 93.6 grams trichloroethylene followed by 1170 grams of vinyl acetate, 117 grams of dibasic lead stearate and 57 grams of a carbon black (available commercially from Columbia Carbon Company as Excelsior Black) also 21 grams of a carbon black (available commercially from Cabot Corporation as Super Carbovac). Vinyl chloride in the amount of 2760 grams was then introduced. The temperature of the batch was raised to 149° F. under agitation. There was then added 3840 grams of vinyl chloride in portions of 160 grams each over a period of 6 hours. After 9 hours and 45 minutes at an initial pressure of 100–115 p.s.i., the pressure dropped to 30 p.s.i. Using the centrifugation and drying procedure of Example I, a black powder was recovered having a bulk density of 0.67 grams per cubic centimeter. 95% of the powder passed through a 40 mesh screen. Carbon retention by the particles was shown to be excellent both by the substantial absence of residual carbon in the centrifugal aqueous layer and by the rubbing test of the dried powder against white sheets of paper. Conversion of monomers to copolymer was estimated by means of weighing the dried copolymer to be greater than 90%. The powder product had a vinyl chloride/acetate weight ratio of 85/15 and the powder was estimated to contain 1.0% of carbon black and 1.5% of dibasic lead stearate based on copolymer resin. Rubbing the powder between white papers left no stain and no dusting problem was encountered in handling. Moldability was excellent.

Example V

The procedure of Example I was repeated excepting that the 9.4 grams of azobisisobutyronitrile was replaced by 19.5 grams of lauroyl peroxide. After 8 hours the pressure was 116 p.s.i. and after 10 hours the pressure still remained at 116 p.s.i. The conversion of monomers was only 30%. This is not an example of the instant invention, but demonstrates that lauroyl peroxide in an amount corresponding to that usually used in the absence of carbon black is not effective as initiator when carbon black is present.

Corresponding attempts to use caproyl peroxide or benzoyl peroxide are likewise unsatisfactory.

Example VI

A series of polymerizations is carried out according to the composition and procedure of Example III except that the weight ratio of vinyl chloride to vinyl acetate is changed in successive experiments to, respectively, 80/20, 82/18, 88/12 and 90/10. In each case a powdered product is obtained which is substantially dustless and which is satisfactory in making a molded product.

Example VII

A series of polymerizations is carried out according to the composition and procedure of Example III except that the percent of carbon black used corresponds, respectively, to 0.1%, .5%, 1%, 1.5%, 2.0%, 2.5% and 3.5% based on weight of charged monomers. In each case the supernatant water on centrifugation is substantially water white and a satisfactory dustless powder is obtained.

Example VIII

A series of polymerizations is carried out according to the composition and procedure of Example III except that the trichloroethylene is replaced respectively by carbon tetrachloride, perchloroethylene, tetrahydrofuran, benzene, toluene, and butyraldehyde. In each case a satisfactory dustless powder product is obtained.

Example IX

A series of polymerizations is carried out according to the composition and procedure of Example III except that the 2,2'-azobisisobutyronitrile is replaced successively by respectively azo-cumene, 2 - t-butyl-azo-2-cyano-4-methoxy - 4 - methyl pentane, 2-t-butyl-azo-2-cyano-4-methyl pentane and 2,2'azobis($\alpha$-$\gamma$)dimethyl valeronitrile. In each case polymerization proceeds smoothly and a satisfactory dustless powder is obtained which performs satisfactorily in a mold.

Example X

A series of polymerization is carried out according to the composition and procedure of Example III except that the dibasic lead stearate is replaced successively by respectively dibasic lead phosphite, tetrabasic lead fumarate, lead chlorosilicate, dibasic lead phthalate, lead stearate, calcium stearate, barium stearate, zinc stearate, cadmium laurate, barium laurate, zinc laurate, barium 2-ethyl-hexoate, barium nonylphenate and sodium stearate. In each case polymerization proceeds smoothly and a satisfactory dustless powder is obtained which performs satisfactorily in a mold.

Example XI

A series of polymerizations is carried out according to the composition and procedure of Example III except that the polyethylene oxide codensate is successively replaced by a suitable amount respectively of gelatin, polyvinyl alcohol, methyl cellulose, poly(vinyl methyl ether-maleic anhydride, maleic anhydride/vinyl acetate copolymer, and hydroxypropyl methyl cellulose. In each case the polymerization proceeds smoothly and a satisfactory dustless powder is otbained which performs satisfactorily in a mold.

It will be understood that it is intended to cover all changes and modifications of the examples of the invention herein chosen for the purpose of illustration which do not constitute departures from the spirit and scope of he invention.

What is claimed is:

1. In a method of making a molded resin article that includes preparing a vinyl chloride/vinyl acetate resin by suspension polymerization of an aqueous dispersion of vinyl chloride and vinyl acetate monomers and molding said composition under heat and pressure; the improvement that comprises adding carbon black directly to the aqueous dispersion of said monomers in an amount by weight of the total of said monomers charged of from about 0.1 to 3.5 percent; and carrying out said suspension polymerization in the presence of said carbon black with an azotype initiator dispersed in said monomers in an amount sufficient to maintain said suspension polymerization.

2. The method of claim 1 wherein said azo-type initiator is present in an amount of from 0.05 percent to 0.15 percent by weight of said monomers charged.

3. A method for producing a molded resin article which comprises
   (1) dispersing in water vinyl chloride monomer, vinyl acetate monomer, a suspending agent, an azo-type initiator, a heat-stabilizer, and finely comminuted carbon,
   (2) suspension copolymerizing said monomers under a pressure initially at 100–130 p.s.i. until the pressure falls to about 30 p.s.i., to form a slurry of aggregate particles, each aggregate particle containing coplymer, stabilizer and carbon, the carbon being in form of small particles coherently embedded in a resin-stabilizer matrix.
   (3) venting off any residual unreacted monomers,
   (4) centrifuging the resultant slurry to separate said aggregate particles,
   (5) drying said particles to form a free-flowing powder, and
   (6) molding said powder under heat and pressure to form a molded article.

4. The method of claim 3 wherein the initiator is azobisisobutyronitrile.

5. A method for producing a dustless molding powder suitable for molding rigid plastic articles, which comprises
   (1) dispersing in water vinyl chloride and vinyl acetate in a weight ratio from 80/20 to 90/10 and, in amount based on the total weight of monomers, from .05 to .30% of a conventional suspending agent, from 0.5 to 2% to dibasic lead stearate, from 0.1 to 3.5% of finely comminuted carbon black, and an amount of azobisisobutyronitrile sufficient to
   (2) cause said monomers to suspension-copolymerize at 100 to 156° C. under a pressure of about 100–130 p.s.i. until the pressure falls to about 30 p.s.i., to form a slurry of aggregate particles, each aggregate particle containing copolymer, stabilizer and carbon black, the carbon being in the form of small particles coherently embedded in a matrix of resin and stabilizer, (3) venting off any residual unreacted monomers,
(4) centrifuging the slurry to separate said aggregate particles, and
(5) drying said particles to form a free-flowing powder.

References Cited

UNITED STATES PATENTS

| | | | |
|---|---|---|---|
| 3,583,956 | 6/1971 | Pointer et al. | 260—29.6 RB |
| 2,279,436 | 4/1942 | Berg | 260—29.6 RB |
| 3,481,893 | 12/1969 | Pungs et al. | 260—41 R |
| 3,557,040 | 1/1971 | Takashina | 260—29.6 R |

MORRIS LIEBMAN, Primary Examiner

P. R. MICHL, Assistant Examiner

U.S. Cl. X.R.

260—29.6 R, H, 998.16